(12) United States Patent
Glückler et al.

(10) Patent No.: US 11,746,857 B2
(45) Date of Patent: Sep. 5, 2023

(54) STARTING DEVICE FOR A TRANSMISSION

(71) Applicant: ZF Friedrichshafen AG, Friedrichshafen (DE)

(72) Inventors: Johannes Glückler, Friedrichshafen (DE); Michael Preuß, Friedrichshafen (DE); Bernard Hunold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/682,285

(22) Filed: Feb. 28, 2022

(65) Prior Publication Data
US 2022/0307574 A1    Sep. 29, 2022

(30) Foreign Application Priority Data
Mar. 26, 2021   (DE) ..................... 10 2021 202 981.7

(51) Int. Cl.
*B60K 6/365*    (2007.10)
*B60K 6/48*    (2007.10)
(Continued)

(52) U.S. Cl.
CPC ............. *F16H 3/666* (2013.01); *B60K 6/365* (2013.01); *B60K 6/48* (2013.01);
(Continued)

(58) Field of Classification Search
CPC . F16H 3/666; F16H 6/365; F16H 6/48; F16H 6/547; F16H 2006/4825;
(Continued)

(56) References Cited

U.S. PATENT DOCUMENTS 6,638,193 B2   10/2003   Hamai
6,960,149 B2   11/2005   Ziemer
(Continued)

FOREIGN PATENT DOCUMENTS

DE   101 15 995 A1   10/2002
DE   101 55 070 A1   10/2002
(Continued)

OTHER PUBLICATIONS

Thomas Belz, "Varianten von Mehrgang-Planetengetrieben" (Mar. 8, 2016).
(Continued)

*Primary Examiner* — Tinh Dang
(74) *Attorney, Agent, or Firm* — FINCH & MALONEY, PLLC (57) ABSTRACT

Disclosed is a starting device for a transmission. The starting device includes a drive input shaft provided for coupling the starting device to a drive engine connected upstream from the transmission. An output shaft is configured to connect the starting device to a gearset of the transmission. The drive input shaft and the output shaft can be connected rotationally fixed to one another by means of a first shifting element. An electric machine is provided whose rotor is connected to an intermediate shaft. The intermediate shaft is coupled to the output shaft by way of at least one gear step. In order to realize integration of the upstream drive engine and the electric machine, a second shifting element is also provided which, when actuated, forms a rotationally fixed connection between the intermediate shaft and the drive input shaft.

14 Claims, 2 Drawing Sheets

(51) Int. Cl.
    *B60K 6/547*     (2007.10)
    *F16H 3/66*     (2006.01)

(52) U.S. Cl.
    CPC ............... *B60K 2006/4825* (2013.01); *F16H 2200/0069* (2013.01); *F16H 2200/2012* (2013.01); *F16H 2200/2046* (2013.01); *F16H 2200/2064* (2013.01); *F16H 2200/2094* (2013.01)

(58) Field of Classification Search
    CPC ..... F16H 2200/0069; F16H 2200/2012; F16H 2200/2046; F16H 2200/2094
    See application file for complete search history.

(56) References Cited

U.S. PATENT DOCUMENTS

| | | | |
|---|---|---|---|
| 8,016,713 | B2 | 9/2011 | Phillips et al. |
| 8,352,135 | B2 | 1/2013 | Lang et al. |
| 8,545,362 | B1 | 10/2013 | Goleski et al. |
| 9,163,705 | B1 | 10/2015 | Hwang et al. |
| 9,399,394 | B2 * | 7/2016 | Kaltenbach ......... B60L 15/2054 |
| 9,506,533 | B2 | 11/2016 | Park et al. |
| 9,822,856 | B2 | 11/2017 | Hoffman |
| 10,604,000 | B2 * | 3/2020 | Kaltenbach ............ B60K 6/365 |
| 11,028,904 | B2 | 6/2021 | Beck et al. |
| 2010/0069191 | A1 | 3/2010 | Swales et al. |
| 2010/0133761 | A1 | 5/2010 | Khvorova et al. |
| 2013/0040776 | A1 | 2/2013 | Mellet et al. |
| 2014/0106923 | A1 | 4/2014 | Borgerson et al. |
| 2014/0106925 | A1 | 4/2014 | Mellet et al. |
| 2014/0141925 | A1 | 5/2014 | Hart et al. |
| 2014/0248989 | A1 | 9/2014 | Hart et al. |
| 2015/0011352 | A1 * | 1/2015 | Beck .......................... F16H 3/62 475/275 |
| 2016/0169342 | A1 | 6/2016 | Cho et al. |
| 2018/0073611 | A1 * | 3/2018 | Beck ....................... B60K 6/387 |
| 2018/0073612 | A1 * | 3/2018 | Beck ........................ F16H 3/663 |
| 2020/0182333 | A1 * | 6/2020 | Mellet .................... B60K 6/365 |

FOREIGN PATENT DOCUMENTS

| | | |
|---|---|---|
| DE | 10 2005 039 461 A1 | 3/2007 |
| DE | 10 2008 032 469 A1 | 1/2009 |
| DE | 10 2010 007 613 A1 | 11/2010 |
| DE | 10 2014 214 212 A1 | 1/2015 |
| DE | 10 2015 221 490 A1 | 5/2015 |
| DE | 10 2014 108 826 A1 | 12/2015 |
| DE | 10 2014 117 679 A1 | 3/2016 |
| DE | 10 2017 206 836 A1 | 10/2018 |
| JP | 2015-194196 A | 11/2015 |
| JP | 2015-197207 A | 11/2015 |
| KR | 10-2016-0072696 A | 6/2016 |

OTHER PUBLICATIONS

German Patent Office, search report in application 10 2021 202 981.7 (dated Nov. 26, 2021).

\* cited by examiner

STARTING DEVICE FOR A TRANSMISSION

RELATED APPLICATIONS

This application claims the benefit of and right of priority under 35 U.S.C. § 119 to German Patent Application no. 10 2021 202 981.7, filed on Mar. 26, 2021, the contents of which are incorporated herein by reference in its entirety.

SUMMARY

The invention relates to a starting device for a transmission, comprising a drive input shaft which is provided for coupling the starting device to a drive engine connected upstream from the transmission, and an output shaft designed to connect the starting device with a gearset of the transmission, wherein the drive input shaft and the output shaft can be connected to one another in a rotationally fixed manner by means of a shifting element, wherein an electric machine is provided, whose rotor is connected to an intermediate shaft, and wherein the intermediate shaft is coupled to the output shaft by way of at least one gear ratio step. Furthermore, the invention relates to a transmission having a starting device as mentioned above, and to a method for operating a transmission.

Starting devices are used in the drivetrains of motor vehicles in order, in the case of motor vehicles with a drive engine in the form of an internal combustion engine, to be able to start off from a standstill. Usually, the starting device concerned is part of a motor vehicle transmission and is provided in the power flow between the internal combustion engine and a downstream gearset of the motor vehicle transmission. Sometimes the starting device concerned is also associated with an electric machine by means of which, alone or in combination with the upstream internal combustion engine, the motor vehicle concerned can be started.

DE 10 2017 208 836 A1 describes a transmission which, on the drive input side of a gearset, is equipped with a starting device. This starting device comprises a powershiftable frictional shifting element in the form of a disk clutch by means of which a drive input shaft of the starting device can be connected rotationally fixed to an output shaft. The output shaft at the same time also forms an input shaft via which a connection to the gearset of the transmission is formed. In addition, a rotor of an electric machine is also coupled to the output shaft, so that as a variant described in DE 10 2017 208 836 A1 the said coupling can be produced by way of one or more intermediate gear ratio steps.

Starting from the above-described prior art, the purpose of the present invention is now to produce a starting device for a transmission such that by means of the said starting device a suitable integration of a drive engine connected upstream from the transmission and an electric machine should be made possible.

This objective is achieved starting from the preamble of the claims in combination with its characterizing features. The dependent claims that follow describe in each case advantageous further developments of the invention. A transmission equipped with a starting device according to the invention is also the object of the present disclosure. In addition, the present disclosure relates to a method for operating a transmission with a starting device according to the invention.

According to the invention, a starting device comprises a drive input shaft provided for coupling the starting device to a drive engine connected upstream from the transmission, and an output shaft designed to connect the starting device to a gearset of the transmission. In this case the drive input shaft and the output shaft can be connected rotationally fixed to one another by means of a first shifting element. In addition, with the starting device an electric machine is also provided, whose rotor is connected to an intermediate shaft, the intermediate shaft being coupled to the output shaft by way of at least one gear ratio step.

Thus, the starting device according to the invention comprises three shafts in the form of the drive input shaft, the output shaft and the intermediate shaft. In an installed condition of the starting device, there is on the output shaft a gearset of the transmission downstream from the starting device in the power flow direction, which can be connected via the starting device according to the invention to a drive engine upstream from the transmission and the starting device in a motor vehicle drivetrain. In this case, by means of the gearset of the transmission preferably a number of gears can be engaged, wherein the gearset can be specifically designed such that changes between the various gears can be carried out either as powershifts or only with traction force interruption.

In contrast, the drive input shaft is provided in order to enable connection, in the installed condition of the starting device, with the drive engine connected upstream from the starting device. Connected to the intermediate shaft is an electric machine, in that the intermediate shaft is connected to a rotor of the electric machine. The connection of the rotor to the intermediate shaft can be firm such that the rotor and the intermediate shaft always rotate at the same rotation speed. Alternatively, however, within the scope of the invention it is also conceivable that the rotor of the electric machine is permanently coupled to the intermediate shaft by way of at least one interposed gear ratio step, this at least one gear step being in the form of a spur gear stage and/or a planetary stage. In both cases, however, there is always a fixed rotation speed ratio between the rotor of the electric machine and the intermediate shaft.

With the starting device a first shifting element is also provided, which in the actuated condition ensures a rotationally fixed connection between the drive input shaft and the output shaft. Particularly preferably, in this case the first shifting element produces a firm connection between the drive input shaft and the output shaft, so that they consequently rotate at the same speed. The drive input shaft and the output shaft are in particular arranged coaxially with one another.

The intermediate shaft and the output shaft are also coupled with one another by way of at least one gear ratio step, so that a rotation movement of the intermediate shaft and therefore also of the rotor of the electric machine is transmitted with a transmission ratio to the output shaft, and conversely, wherein the transmission ratio is defined by the at least one gear step. Accordingly, the intermediate shaft and the output shaft are also coupled to one another by virtue of the at least one gear step with a fixed rotation speed ratio. Preferably, the coupling of the intermediate shaft and the output shaft by way of the at least one gear step is carried out in such manner that the intermediate shaft and the output shaft are coaxial with one another. Also, preferably, the intermediate shaft is a hollow shaft which is arranged surrounding the output shaft radially and covering it axially. A transmission ratio of the at least one gear step is in particular selected such that a rotation movement of the intermediate shaft is geared down to the slow range on the output shaft. In that way the use of a fast-running, compact electric machine is enabled.

The invention now adopts the technical principle that in addition a second shifting element is provided, which when actuated connects the intermediate shaft and the drive input shaft rotationally fixed to one another. In other words, the drive input shaft and the intermediate shaft can be connected to one another in a rotationally fixed manner by actuating a second shifting element.

Such a design of a starting device for a transmission has the advantage that in this way, for the coupling of the drive input shaft to the output shaft two different power flow routes and also two different transmission ratios are possible. This is because by actuating the first shifting element a power flow route is established starting from the drive input shaft directly to the output shaft, whereas a closed condition of the second shifting element produces a power flow route starting from the drive input shaft to the intermediate shaft and from there, via the at least one gear step, to the output shaft.

Thus, for the integration of the drive engine connected upstream from the starting device into a motor vehicle drivetrain, the at least one gear step is used, by which the electric machine is integrated, whereas the upstream drive engine can also be directly connected rotationally fixed via the first shifting element to the gearset of the downstream transmission. Accordingly, as part of a starting process the gear ratio of the at least one gear step can be used as a preliminary ratio for starting, while on the other hand at the conclusion of the starting process the said preliminary ratio can be selectively disengaged so that subsequently, efficiency-optimized operation of the upstream drive engine is enabled. At the same time, in this case the electric machine is permanently coupled to the output shaft by way of the at least one gear step, so that owing to the operative preliminary ratio a fast-running, compact electric machine can be used. By opening both of the shifting elements the electric machine can be coupled alone to the gearset, while the upstream drive engine is then decoupled from the gearset.

In DE 10 2017 206 836 A1 it is true that a variant is described in which the rotor of the electric machine is coupled to the downstream gearset of the transmission by way of at least one gear step. However, it is not indicated that an intermediate shaft permanently connected to the rotor of the electric machine can be brought into connection with the drive input shaft of the starting device by means of a further shifting element. Accordingly, the at least one gear step in that case cannot be used for connecting the upstream drive engine.

In the starting device according to the invention, when the second shifting element is in its actuated condition it brings the intermediate shaft and the drive input shaft into rotationally fixed connection with one another, from which, in the context of the invention, it is to be understood that when the second shifting element has been actuated, the intermediate shaft and the drive input shaft are coupled to one another with a fixed rotation speed ratio. This has the consequence that owing to the permanent coupling of the intermediate shaft to the drive input shaft via the at least one gear step, there is also a fixed rotation speed ratio between the drive input shaft and the output shaft, this rotation speed ratio being different from the rotation speed ratio which, in the closed condition of the first shifting element, exists between the drive input shaft and the output shaft. Particularly preferably, when the second shifting element has been actuated the intermediate shaft and the drive input shaft are connected firmly to one another so that the intermediate shaft and the drive input shaft rotate with essentially the same rotation speed.

In accordance with an embodiment of the invention, the intermediate shaft and the output shaft are coupled with one another by way of a planetary stage which comprises a first element, a second element and a third element, respectively in the form of a sun gear, a planetary web and a ring gear. The first element is connected rotationally fixed to the intermediate shaft and the second element is connected rotationally fixed to the output shaft, whereas the third element of the planetary stage is held permanently fixed. A coupling of the intermediate and output shafts by way of a planetary stage has the advantage that on the one hand an integration of the electric machine connected to the intermediate shaft with a suitable gear ratio in a compact manner is made possible. On the other hand, by virtue of the planetary stage a summing of the drive powers of the electric machine and the upstream drive engine can take place when the drive input shaft is connected rotationally fixed to the output shaft by means of the first shifting element and at the same time a drive power is fed in from the electric machine. Particularly preferably, the aforesaid planetary stage is in this case the only gear stage by which the intermediate shaft and the output shaft are coupled with one another.

In a further development of the above embodiment, the first element of the planetary stage is the sun gear, the second element is the planetary stage of the planetary web and the third element of the planetary stage is the ring gear. Here, on the planetary web at least one planetary gearwheel is mounted to rotate, which gearwheel meshes both with the sun gear and with the ring gear. In this case therefore, the planetary stage is in the form of a minus-planetary-gearset, which allows a particularly compact structure in the radial direction. Alternatively however, a design as a plus-planetary-gearset is also conceivable in principle within the scope of the invention, in which design the planetary web carries at least a pair of planetary gearwheels of which one planetary gearwheel meshes with the sun gear and one with the ring gear and, moreover, the said planetary gearwheels mesh with one another. In this case the first element would then be the sun gear, the second element the ring gear, and the third element the planetary web.

According to a possible embodiment of the invention, the first shifting element is in the form of an interlocking shifting element, particularly in the form of a claw-type shifting element. The use of an interlocking shifting element for the rotationally fixed connection of the drive input shaft and the output shaft has the advantage that an interlocking shifting element can be made particularly compactly and, in its open condition, is also characterized by low drag losses. Furthermore, an associated actuating device of an interlocking shifting element does not have to be supplied with energy permanently in order to keep the shifting element in its current shift position. Since in the present case a power flow from the drive input shaft via the intermediate shaft and the at least one gear step takes place, in particular, only during the course of a starting process or a crawling process, but otherwise it is mainly the case that a direct connection of the drive input shaft to the output shaft is desired, there is no need for energy to be permanently supplied to an associated actuating device for the closed condition of the first shifting element which has to be predominantly maintained.

Alternatively, in principle the first shifting element can also be a frictional shifting element, particularly in the form of a disk-type shifting element. In that case the first shifting element is then preferably a 'normally closed' shifting element, i.e. if no control command is issued to an associated actuating device of the first shifting element, then the first shifting element remains in the closed condition.

Alternatively, preferred but supplementary to the design of the first shifting element as an interlocking shifting element, the second shifting element is in the form of a frictional shifting element, particularly a disk-type shifting element. Advantageously, the second shifting element can thereby also be actuated under load and can correspondingly form a connection between the intermediate shaft and the drive input shaft, so that the second shifting element too can be used as a starting element without problems during the course of a starting process.

As a further development of the above variant, the second shifting element is made as a shifting element which is open in a non-actuated condition of an associated actuating device. This ensures that the second shifting element, made in the form of a frictional shifting element, is open when an associated actuating device is not being supplied with energy ('normally open'). Advantageously, this also ensures that the second shifting element is not actuated together with the first shifting element, which would otherwise result in blocking of the starting device.

In accordance with an embodiment of the invention, in a first section the drive input shaft is connected to the second shifting element, and radially inside the said first shaft section a second shaft section of the drive input shaft is provided, where a connection of the drive input shaft to the first shifting element is formed. In addition, an actuation of the first shifting element can be carried out by shaft access via the first shaft section. Thus, the first shifting element is radially on the inside of the second shifting element and for connection to the two shifting elements the drive input shaft is provided with shaft sections, of which the first shaft section is a hollow shaft section radially inside which the second shaft section in the form of a solid shaft section is arranged. Advantageously, in this way a connection of the drive input shaft to the two shifting elements arranged coaxially with it is realized.

An object of the invention is also a transmission, which is in particular a motor vehicle transmission. This transmission comprises a starting device as described above, which can be designed in accordance with one or more of the aforesaid variants. The starting device according to the invention is preferably connected upstream from a gearset of the transmission accommodated in a transmission housing of the transmission, such that with this gearset in particular a number of different gears can be engaged. Within the scope of the invention, a change between gears can be carried out under load, partly under load, or only with traction force interruption. In this case, in the installed condition of the transmission the drive input shaft of the starting device serves to form a connection to a drive engine connected upstream from the transmission in a motor vehicle drivetrain.

In accordance with an embodiment of a transmission according to the invention, the output shaft of the starting device is connected rotationally fixed to an input shaft by means of which a connection is formed of the output shaft of the starting device to a gearset of the transmission. In this case the output shaft of the starting device and the input shaft can be separate shafts which are permanently connected to one another in a rotationally fixed manner. Alternatively, the output shaft and the input shaft can be made integrally, as one piece.

In a transmission as mentioned above, a change is made from a coupling of the drive input shaft of the starting device to the output shaft of the starting device by way of the second shifting element, to a coupling of the drive input shaft of the staring device to the output shaft of the starting device by way of the first shifting element, in that first the second shifting element is opened. Thereafter, a rotation speed of the output shaft is increased by carrying out a shift in the gearset of the transmission, and the first shifting element is closed as soon as an essentially synchronous rotation speed has been produced in the first shifting element.

In an alternative to what is described above, a change from an actuation of the second shifting element to a closed condition of the first shifting element can be carried out by first opening the second shifting element and then shifting to neutral in a gearset of the transmission. In this case, in the context of the invention, the latter means that in the downstream gearset an input shaft of the gearset is decoupled from a drive output shaft of the transmission. After this, the output shaft is then brought to a rotation speed by an electric machine such that at the first shifting element the rotation speeds are essentially synchronous. When that has been done, the first shifting element is then closed.

The two above-described variants for operating a transmission are carried out in particular during the course of a starting process by means of the drive engine connected upstream from the transmission in the motor vehicle drivetrain. Moreover, the second shifting element is in the form of a frictional shifting element whereas the first shifting element is an interlocking shifting element. For the starting process a starting gear is engaged in the gearset of the transmission, and the second shifting element, operating with slip, is then used for coupling the drive input shaft with the output shaft of the starting device via the at least one gear step of the starting device, while the first shifting element is open. In this case the at least one gear step acts to relieve the load on the second shifting element.

During the course of the starting process, the upstream drive engine is preferably increasingly connected to an input shaft of the gearset of the transmission by progressively closing the second shifting element, so that from the time the second shifting element is completely closed the drive input shaft and the intermediate shaft of the starting device are connected rotationally fixed to one another. If necessary, from a certain rotation speed of the drive input shaft and thus also of the drive engine connected upstream from it, a gearshift takes place in the gearset of the transmission. The change from an actuation of the second shifting element to an actuation of the first shifting element is subsequently carried out by one of the two aforesaid variants, in order to obtain better efficiency due to the direct rotationally fixed connection of the drive input shaft to the output shaft of the starting device. Particularly preferably, this change-over is carried out during a randomly occurring pull-push change in order not to cause a vehicle driver any discomfort due to the concomitant traction force interruption.

In a further method according to the invention for operating a transmission, a change is carried out from coupling the drive input shaft to the output shaft of the starting device by means of the first shifting element in the form of an interlocking shifting element, to coupling the drive input shaft to the output shaft of the starting device by means of the second shifting element, which is in the form of a frictional shifting element. This change-over takes place in that with the second shifting element in the closed condition, the first shifting element is progressively closed in a slipping condition, so that the first shifting element is opened as soon as by virtue of a progressive power flow by way of the second shifting element a load-free condition of the first shifting element has been reached. In that way the first shifting element can be rendered free from load without problems, and therefore also disengaged.

The above method is in particular carried out during the course of a crawling function, in which a change takes place from normal driving owing to a high torque demand, for example due to driving up a steep incline at a slow speed. By leading the power flow via the second shifting element and therefore via the at least one gear step, the gear ratio of the at least one gear step can be used for an additional increase of the torque, so that when driving slowly a high torque is available.

Preferably, a transmission as described above is part of a motor vehicle drivetrain of a motor vehicle, in particular a hybrid vehicle. In that case the transmission is provided between the upstream drive engine and downstream components, wherein on its drive output side the transmission is preferably connected to a differential gear system by way of which, this being a transverse differential, a drive movement geared by the transmission is distributed to drive wheels of a drive axle. Alternatively, however, the downstream differential gear system can be in the form of a longitudinal differential by way of which a distribution to more than one drive axles of the motor vehicle takes place.

The invention is not restricted to the indicated features recited in the claims. There are options for combining individual features with one another insofar as they emerge from the claims, the description of a preferred embodiment of the invention that follows, or directly from the drawings. References in the claims to the drawings by the use of indexes are not intended to limit the protective scope of the claims.

BRIEF DESCRIPTION OF THE DRAWINGS

An advantageous embodiment of the invention, which is explained in greater detail below, is illustrated in the drawings, which show.

DETAILED DESCRIPTION

Figure 1:
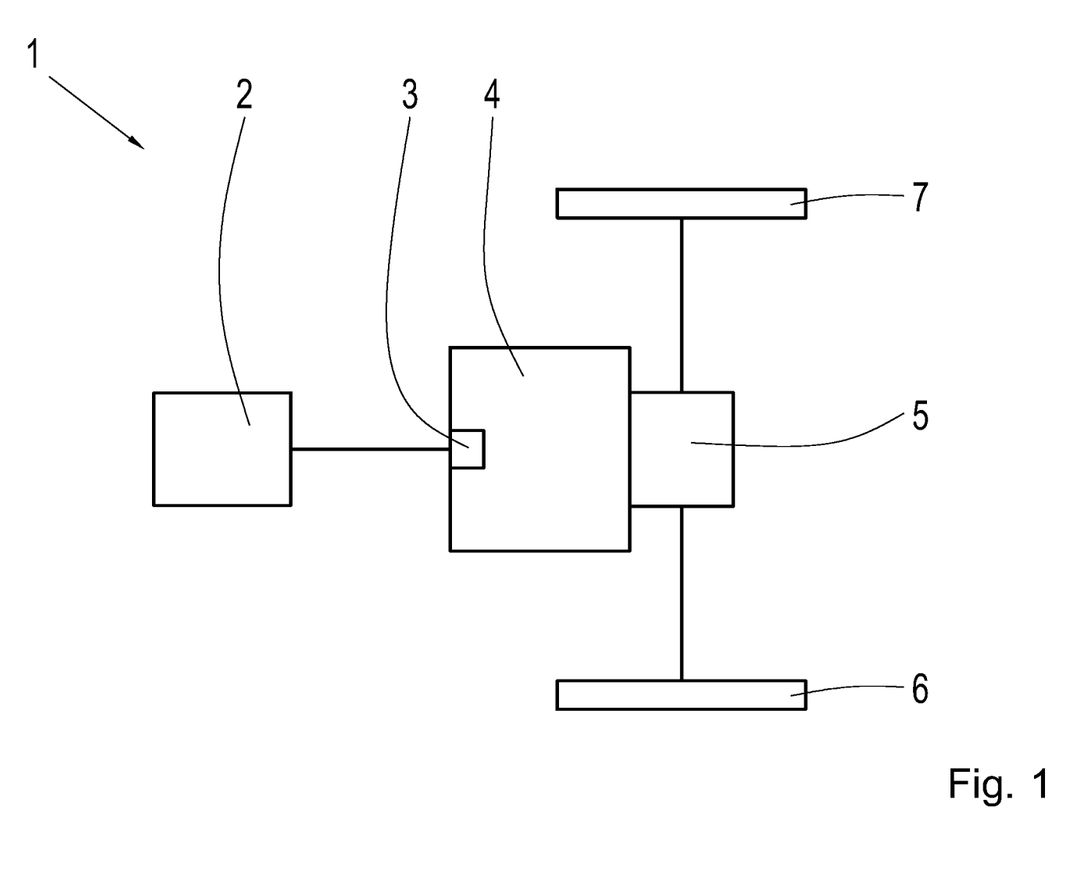
FIG. 1: A schematic representation of a motor vehicle drivetrain.

FIG. 1 shows a schematic representation of a motor vehicle drivetrain 1 of a hybrid vehicle, in particular a passenger car. In this case the motor vehicle drivetrain comprises an internal combustion engine 2 which is connected to a transmission 4 via an intermediate torsion fluctuation damper 3. Downstream on the output side of the transmission 4 is connected a differential gear system 5, by means of which drive power is distributed to drive wheels 6 and 7 of a drive axle of the hybrid vehicle.

The transmission 4 and the torsion fluctuation damper 3 are arranged in a common housing of the transmission 4, in which the differential gear system 5 can also be integrated. As can also be seen in FIG. 1, the internal combustion engine 2, the torsion fluctuation damper 3, the transmission 4 and also the differential gear system 5 are aligned in the travel direction of the hybrid vehicle.

Figure 2:
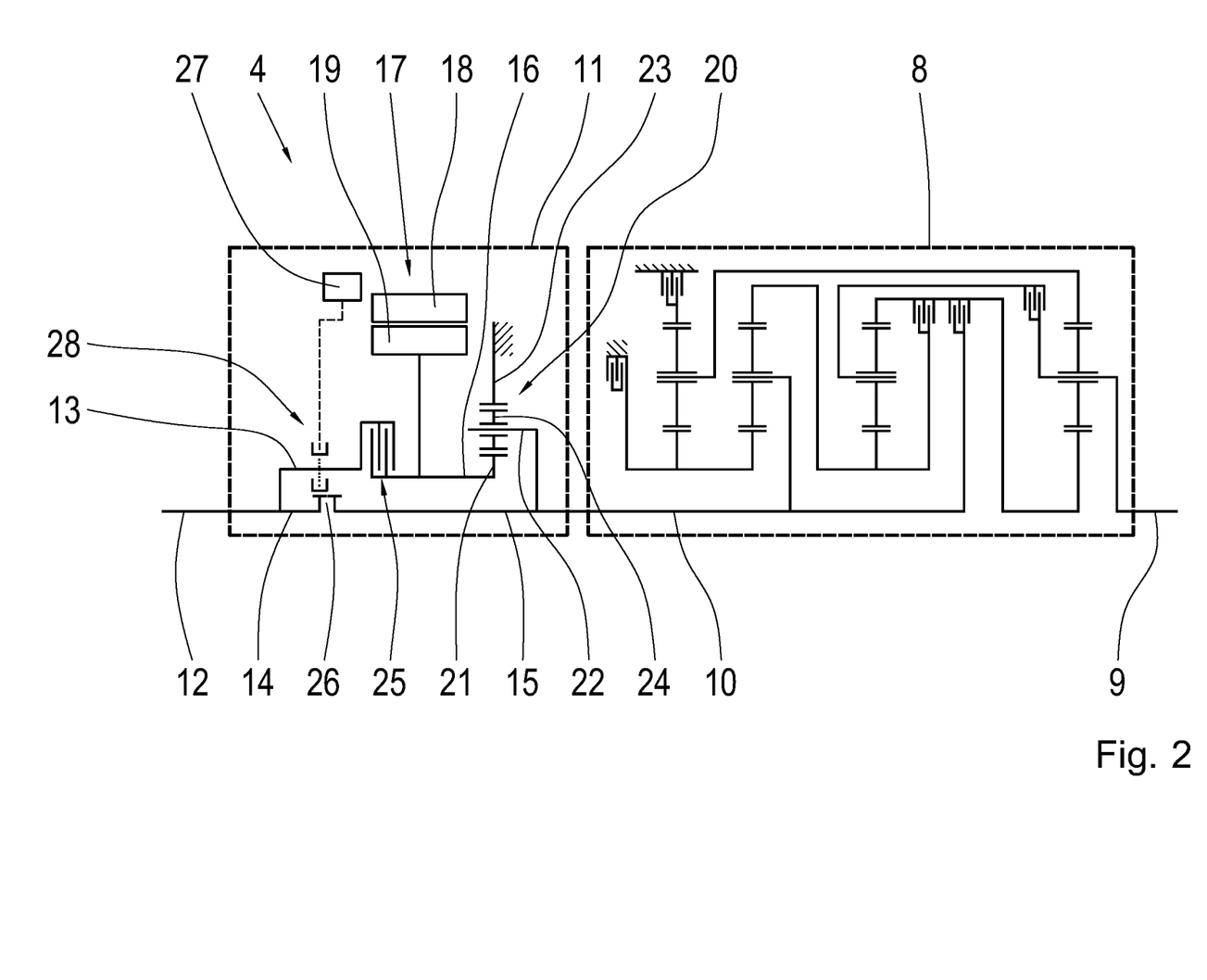
FIG. 2: A schematic representation of a transmission of the motor vehicle drivetrain in FIG. 1, which corresponds to a preferred embodiment of the invention.

FIG. 2 shows a schematic representation of the transmission 4. In this case the transmission 4 is designed in accordance with a preferred embodiment of the invention and comprises a gearset 8 which is connected via a drive output shaft 9 to the downstream differential gear system 5 shown in FIG. 1 and by means of which various gears can be engaged between the drive output shaft 9 and an input shaft 10 arranged coaxially therewith. Changes between the gears of the gearset 8 can in each case be made under load. On the input shaft 10 the gearset 8 is also connected to an upstream starting device 11 of the transmission 4, so that by way of the starting device 11, in the motor vehicle drivetrain 1 in FIG. 1 a connection on the drive input side, of the input shaft 10 to the upstream internal combustion engine 2 can be made.

The starting device 11 is in this case designed in accordance with a preferred embodiment of the invention. Thus, the starting device 11 comprises a drive input shaft 12 which, in the motor vehicle drivetrain 1 of FIG. 1 is connected to the upstream torsion fluctuation damper 3 and is thus permanently coupled to the internal combustion engine 2. The drive input shaft 12 is coaxial with the input shaft 10 and on a side facing toward the gearset 8 has a first shaft section 13 in the form of a hollow shaft section and radially inside which a second shaft section 14 of the drive input shaft 12 is provided. The second shaft section 14 is in the form of a solid shaft section.

Besides the drive input shaft 12, the starting device 11 also has an output shaft 15 and an intermediate shaft 16, which are arranged coaxially with the drive input shaft 12. The output shaft 15 is in this case permanently connected rotationally fixed to the input shaft 10 of the gearset 8, so the output shaft 15 and the input shaft 10 can be made integrally, as one piece. Alternatively, however, the input shaft 10 and the output shaft 15 can be made as separate shafts which are permanently connected and rotationally fixed to one another by means of an appropriate connection, and which therefore rotate at the same rotation speed.

Whereas the output shaft 15 is made essentially as a solid shaft, the intermediate shaft 16 is a hollow shaft. Coaxially with the drive input shaft 12, the output shaft 15 and the intermediate shaft 16, an electric machine 17 is also installed, which machine consists of a stator 18 and a rotor 19 and can be operated on the one hand as a generator and on the other hand as an electric motor. The rotor 19 of the electric machine 17 is in this case connected permanently and in a rotationally fixed manner to the intermediate shaft 16, this connection being a solid connection between the rotor 19 and the intermediate shaft 16.

As can also be seen in FIG. 2, the intermediate shaft 16 and the output shaft 15, and therefore also the input shaft 10 of the gearset 8, are permanently coupled by way of a gear step in the form of a planetary stage 20. The planetary stage 20 consists of a sun gear 21, a planetary web 22 and a ring gear 23, wherein the planetary web 22 carries at least one planetary gearwheel 24 mounted to rotate on it, this gearwheel meshing with both the sun gear 21 and the ring gear 23.

In the present case the sun gear 21 is permanently connected rotationally fixed to the intermediate shaft 16, whereas in contrast the planetary web 22 is permanently connected to the output shaft 15 and therefore also to the input shaft 10. On the other hand, the ring gear 23 is permanently fixed and thus permanently prevented from rotating, this preferably being done by connecting the ring gear 23 rotationally fixed to a transmission housing of the transmission 4 or to a component attached to the transmission housing in a rotationally fixed manner. By virtue of the planetary stage 20 a rotation movement of the intermediate shaft 16 is geared down to the slow range on the output shaft 15, so the electric machine 17 can be made as a compact and fast-running machine.

The drive input shaft 12 can on the one hand be connected by its first shaft section 13, by means of a shifting element 25, rotationally fixed to the intermediate shaft 16 whereby, as a result, a rotation movement of the drive input shaft 12 is transmitted to the output shaft 15 with the gear ratio of the planetary stage 20. On the other hand, the drive input shaft 12 can also be connected by its second shaft section 14, directly rotationally fixed by means of a shifting element 26, to the output shaft 15, so that in this way the drive input shaft 12 and the output shaft 15, and therefore also the input shaft 10, all rotate with the same rotation speed.

In the present case the shifting element 25 is in the form of a frictional shifting element and is specifically a disk clutch, by means of which the rotationally fixed connection between the first shaft section 13 of the drive input shaft 12 and the intermediate shaft 16 can be formed under load. In this case, if a control element associated with the shifting element 25—not illustrated further here—is not actuated, the shifting element 25 is in an open condition ("normally open"). On the other hand, the shifting element 26 is in the form of an interlocking shifting element, such that the shifting element 26 is an unsynchronized claw clutch. The shifting element 26 is actuated by a control element 27 by means of a shaft access via the first shaft section 13.

During the operation of the motor vehicle drivetrain 1 in FIG. 1, in a starting process of the hybrid vehicle a starting gear is selected in the gearset 8 of the transmission 4 and the shifting element 25 is used as the starting element. For that purpose, the internal combustion engine 2 is adjusted to a desired starting rotation speed and, in addition, the shifting element 25 is progressively closed with slip, whereby rotation speed equality is progressively produced between the drive input shaft 12 and the intermediate shaft 16. During this the rotation movement of the intermediate shaft 16 is geared via the planetary stage 20 to the output shaft 15 and hence also the input shaft 10. The gear ratio of the planetary stage 20 then acts to relieve the load on the shifting element 25 owing to the thereby lesser effect of the torque on the shifting element 25. If the shifting element 25 is then fully closed and a motor rotation speed of the internal combustion engine 2 is high enough, or a gearshift is the transmission 4 is attempted, then a shift to a higher gear takes place in the gearset 8 of the transmission 4.

Thereafter, driving first continues with the shifting element 25 closed until with a randomly occurring pull-push change a shift takes place in the starting device 11 by changing from the shifting element 25 to the shifting element 26. The background here is that when the shifting element 26 is closed, driving can be done with greater efficiency since with the same gear in the gearset 8, a lower rotation speed is set in the internal combustion engine 2 and in addition, for the shifting element 26 no permanent energy supply has to be supplied to the actuating device 27.

In a first variant of the invention the changeover from a power flow route via the shifting element 25 to a power flow route via the shifting element 26 takes place by first opening the shifting element 25. Thereafter, in the gearset 8 of the transmission 4 a downshift to a lower gear is initiated if possible and thereby the rotation speed of the input shaft 10 and hence also that of the output shaft 15 of the starting device 11 is increased. When that has taken place a slight correction of the motor rotation speed of the internal combustion engine 2 is made in order to obtain a synchronous rotation speed at the shifting element 26. When that has been done, the shifting element 26 is closed and after that, if necessary, a gearshift in the gearset 8 of the transmission 4 to a desired gear is carried out.

Alternatively, the changeover from the shifting element 25 to the shifting element 26 can also be carried out by first opening the shifting element 25 and also carrying out a shift to neutral in the gearset 8 of the transmission 4, after which the input shaft 10 of the gearset 8 is decoupled from the drive output shaft 9. Thereafter, by means of the electric machine 17 with the help of the intermediate shaft 16 the output shaft 15 of the starting device 11 is brought to a rotation speed such that the rotation speeds at the shifting element 26 are essentially synchronous. Since the output shaft 15 is coupled permanently to the intermediate shaft 16 and hence also to the rotor 19 of the electric machine by way of the planetary stage 20, the electric machine can be used to produce the synchronous rotation speed. When the rotation speed speeds at the shifting element 26 are essentially synchronous, the shifting element 26 is closed. After that, a powershift can be carried out to a desired gear in the gearset 8.

The starting device 11 of the transmission 4 can also be used while the hybrid vehicle is driving to change to a crawling mode, in which the hybrid vehicle can be driven up a steep incline more easily since the gear ratio of the planetary stage 20 is also being used. In an initial situation a gear is selected in the gearset 8 of the transmission 4 and the shifting element 26 is closed in the starting device 11, while the shifting element 25 is open. If the need for a high torque at low driving speed is now recognized, for example due to a steep inclination of the road, then a shift from a power flow route via the shifting element 26 to a power flow route via the shifting element 25 is initiated. For this the shifting element 25 is progressively closed with slip, so that the power flow route via the shifting element 25 increases. From a condition in which the shifting element 26 is essentially free from load, the shifting element 26 is then opened. After that the shifting element 25 is then fully closed so that the gear ratio of the planetary stage 20 can be used for driving.

In the motor vehicle drivetrain 1 of FIG. 1, purely electric driving can also take place in that, in the starting device 11, the shifting elements 25 and 26 are both open and a drive power is supplied by the electric machine 17 operating as an electric motor. In this case a drive input movement of the electric machine 17 is transmitted by way of the planetary stage 20 to the output shaft 15 of the starting device 11 and hence also to the input shaft 10 of the gearset 8.

Furthermore, in the closed condition of the shifting element 26 of the starting device 11, the drive powers of the internal combustion engine 2 and the electric machine 17 can be summed, so that in such a case the planetary stage 20 functions as a summation stage.

By virtue of the design of a starting device according to the invention, a suitable integration of an electric machine and an upstream internal combustion engine can be realized.

INDEXES

1 Motor vehicle drivetrain
2 Internal combustion engine
3 Torsion fluctuation damper
4 Transmission
5 Differential gear system
6 Drive wheel
7 Drive wheel
8 Gearset
9 Drive output shaft
10 Input shaft
11 Starting device
12 Drive input shaft 13 First shaft section
14 Second shaft section
15 Output shaft
16 Intermediate shaft
17 Electric machine
18 Stator
19 Rotor
20 Planetary stage
21 Sun gear
22 Planetary web
23 Ring gear
24 Planetary gearwheel
25 Shifting element
26 Shifting element
27 Actuating device
28 Shaft access

The invention claimed is:

1. A starting device for a transmission having a drive engine, the starting device comprising:
   a drive input shaft configured to couple the starting device to a drive engine connected upstream from the transmission;
   an output shaft configured to connect the starting device to a gearset of the transmission;
   a first shifting element that is actuatable to directly connect the drive input shaft and the output shaft rotationally fixed to each other such that the drive input shaft and the output shaft rotate in unison;
   an electric machine with a rotor that is connected to an intermediate shaft;
   at least one gear step coupling the intermediate shaft to the output shaft; and
   a second shifting element, which when actuated, connects rotationally fixed the intermediate shaft and the drive input shaft.

2. The starting device according to claim 1, further comprising a planetary stage coupling the intermediate shaft and the output shaft, the planetary stage including a first element, a second element, and a third element, respectively, in the form of a sun gear, a planetary web, and a ring gear, wherein the first element is connected rotationally fixed to the intermediate shaft, the third element of the planetary stage is permanently fixed, and the second element is connected rotationally fixed to the output shaft such that when the first shifting element is actuated the drive input shaft, the output shaft and the second element of the planetary stage are rotationally fixed to each other.

3. The starting device according to claim 2, wherein the first element of the planetary stage is the sun gear, the second element of the planetary stage is the planetary web, and the third element of the planetary stage is the ring gear, and at least one planetary gearwheel is mounted to rotate on the planetary web so that the at least one planetary gearwheel meshes both with the sun gear and with the ring gear.

4. The starting device according to claim 1, wherein, the first shifting element is in the form of an interlocking shifting element.

5. The starting device according to claim 4, wherein the first shifting element is in the form of a claw-type shifting element.

6. The starting device according to claim 1, wherein the second shifting element is in the form of a frictional shifting element.

7. The starting device according to claim 6, wherein the second shifting element is in the form of a disk-type shifting element.

8. The starting device according to claim 6, wherein the second shifting element is a shifting element which is open when in the non-actuated condition of an associated actuating device.

9. The starting device according to claim 1, wherein the drive input shaft is bifurcated and includes a first shaft section that extends axially and is connected to the second shifting element, and the drive input shaft includes a second shaft section that extends axially, the first and the second shaft sections being radially spaced from each other, and the second shaft section being arranged radially inside the first shaft section, wherein the second shaft section connects the drive input shaft to the first shifting element such that the first shifting element is actuatable via a shaft access by way of the first shaft section.

10. A transmission for a motor vehicle, the transmission, comprising a starting device according to claim 1.

11. The transmission according to claim 10, wherein the output shaft of the starting device is connected rotationally fixed to an input shaft by way of which the output shaft of the starting device is connected to a gearset of the transmission.

12. A method for operating a transmission having a starting device according to claim 7, the method comprising:
    changing a coupling of the drive input shaft to the output shaft by means of the second shifting element, to a coupling of the drive input shaft to the output shaft by means of the first shifting element, wherein changing the coupling includes:
    progressively closing with slip the second shifting element while the first shifting element is in a closed condition;
    opening the first shifting element upon reaching a load-free condition of the first shifting element, the load-free condition by virtue of a power flow route via the second shifting element; and
    fully closing the second shifting element.

13. A starting device for a transmission having a drive engine, the starting device comprising:
    a drive input shaft configured to couple the starting device to a drive engine connected upstream from the transmission;
    an output shaft configured to connect the starting device to a gearset of the transmission;
    a first shifting element configured that is actuatable to connect rotationally fixed the drive input shaft and the output shaft;
    an electric machine with a rotor that is connected to an intermediate shaft;
    at least one gear step coupling the intermediate shaft to the output shaft; and
    a second shifting element, which when actuated, connects rotationally fixed the intermediate shaft and the drive input shaft, the transmission having the starting device being operable according to a method comprising:
    changing from a coupling of the drive input shaft with the output shaft by means of the second shifting element, to a coupling of drive input shaft with the output shaft by means of the first shifting element, wherein changing the coupling includes:
    first opening the second shifting element;
    then, increasing a rotation speed of the output shaft by carrying out a gearshift in a gearset of the transmission;
    and then closing the first shifting element as soon as essentially synchronous rotation speeds are reached in the first shifting element.

14. A starting device for a transmission having a drive engine, the starting device comprising:
- a drive input shaft configured to couple the starting device to a drive engine connected upstream from the transmission;
- an output shaft configured to connect the starting device to a gearset of the transmission;
- a first shifting element configured that is actuatable to connect rotationally fixed the drive input shaft and the output shaft;
- an electric machine with a rotor that is connected to an intermediate shaft;
- at least one gear step coupling the intermediate shaft to the output shaft; and a second shifting element, which when actuated, connects rotationally fixed the intermediate shaft and the drive input shaft, the transmission having the starting device being operable according to a method comprising:
- changing a coupling of the drive input shaft to the output shaft by means of the second shifting element, to a coupling of the drive input shaft to the output shaft by means of the first shifting element, wherein changing the coupling includes:
- first opening the second shifting element;
- shifting a gearset of the transmission to neutral;
- then bringing the output shaft to a rotation speed by the electric machine such that a rotation speed at the first shifting element and the rotation speed of the output shaft are essentially synchronous;
- and then closing the first shifting element.

\* \* \* \* \*